March 2, 1948.  L. V. McCARTY  2,436,933
DIFFERENT DENSITY FUEL LEVEL CONTROL DEVICE
Filed Nov. 5, 1943  2 Sheets—Sheet 1
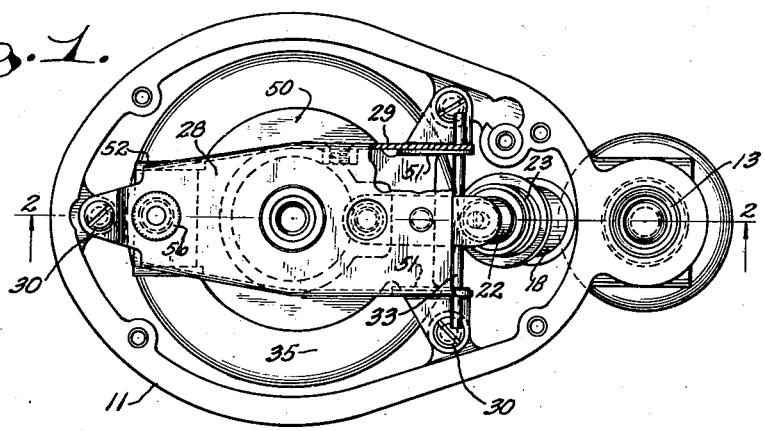
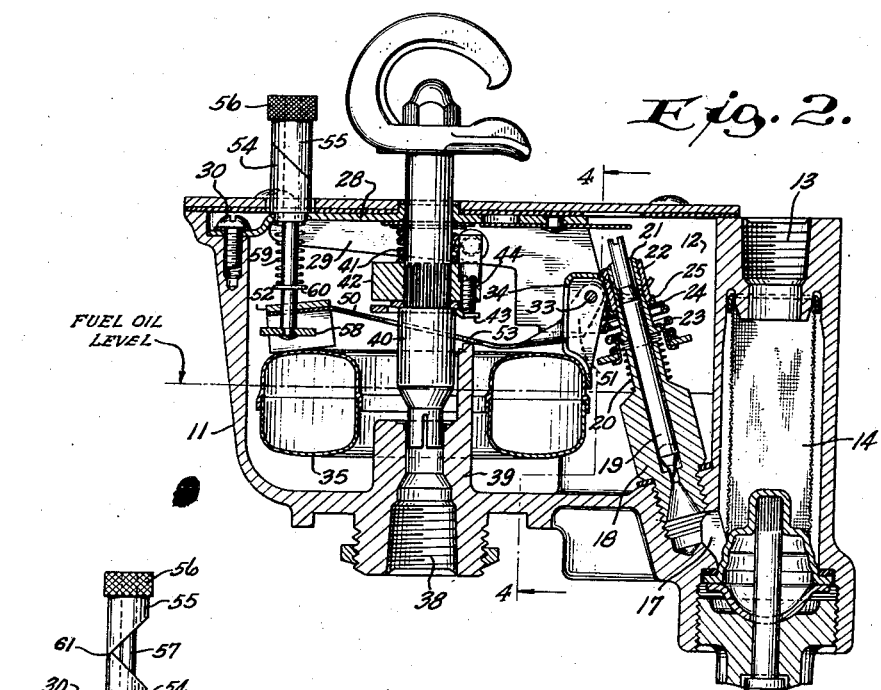
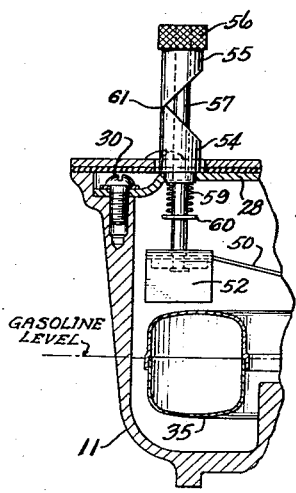
INVENTOR.
LOURDES V. McCARTY
BY John W. Michael
ATTORNEY.

March 2, 1948.  L. V. McCARTY  2,436,933
DIFFERENT DENSITY FUEL LEVEL CONTROL DEVICE
Filed Nov. 5, 1943  2 Sheets-Sheet 2

INVENTOR.
LOURDES V. McCARTY.
BY John W. Michael
ATTORNEY.

Patented Mar. 2, 1948

2,436,933

UNITED STATES PATENT OFFICE 2,436,933

DIFFERENT DENSITY FUEL LEVEL CONTROL DEVICE

Lourdes V. McCarty, Milwaukee, Wis., assignor to Automatic Products Company, Milwaukee, Wis., a corporation of Wisconsin Application November 5, 1943, Serial No. 509,096

5 Claims. (Cl. 137—68)

This invention relates in general to devices for controlling the supply of liquid fuel from a reservoir to a burner of the gravity feed type and more particularly to a device for maintaining a constant level of fuel in a chamber between the reservoir and the burner and thereby maintaining a desired flow of fuel to the burner.

In gravity feed burners for liquid fuel, the burner can be operated properly only if a desired flow of fuel is supplied, which flow is readily obtained if a given hydrostatic head is maintained ahead of the burner. Such hydrostatic head can be readily maintained if a chamber is provided between the reservoir and burner in which a constant level of fuel is maintained by an inlet valve under the control of a float buoyed up in the fuel in the chamber. But proper positioning of the float is obtained only if the displacement of the float is calculated for a given density or viscosity of fuel, and such float will not maintain a correct level when fuel of different density or viscosity, than that for which the float was calculated, is used. However, in many instances it is impossible to obtain a continuous supply of liquid fuel of the density or viscosity for which the float was designed or even of a density or viscosity sufficiently similar to the given density or viscosity to secure satisfactory operation of the burner. One instance of the above conditions is in military operations where only gasoline may be available at some times and only heavy fuel oil or lubricating oil may be available at other times. In either event, it is essential that the burner operate satisfactorily with either fuel with a minimum of adjustment. Such adjustment must be simple and must give ready and unmistakeable indication of the setting of the adjustment.

It is therefore an object of the present invention to provide a device for maintaining a constant flow in the supply of liquid fuel to a burner of the gravity feed type by maintaining the fuel in a supply chamber ahead of the burner at a given level under the control of a float and regardless of the density or viscosity of the fuel used.

Another object of the invention is to provide means permitting the use of a float designed for liquid fuel of low specific gravity or viscosity in controlling the fuel level in a supply chamber when fuel of a higher specific gravity or viscosity is used.

Another object of the invention is to provide means compensating for increased buoyancy in a float for controlling an inlet valve in a liquid fuel supply chamber when the liquid in which the float acts is changed from a low specific gravity to a higher specific gravity or a low viscosity to a higher viscosity without affecting the movement of the float in controlling the fuel level and hence in controlling the quantity of fuel supplied to a burner to secure a desired B. t. u. output from the burner.

Objects and advantages other than those above set forth will be apparent from the following description when read in connection with the accompanying drawings, in which:

Fig. 1 is a top plan view of a float-controlled constant level fuel supply device embodying the present invention, the cover having been removed and a portion of the supporting bracket for the internal structure having been cut away to show particularly the mounting of one end of means for compensating for differences in the specific gravity of the fuel of which the flow is to be controlled by the float;

Fig. 2 is a vertical, sectional view taken on the plane of line 2—2 of Fig. 1 but with the cover of the device in place to illustrate the construction of the means for compensating for changes in specific gravity of the fuel and to show the relation of such device to the float and the mounting of the device on the supporting bracket, the parts being shown in the position attained upon use of fuel of high specific gravity;

Fig. 3 is a fragmentary view similar to Fig. 2 but showing the position of the float and its loading means in the position when fuel of low specific gravity is used;

Figure 5:
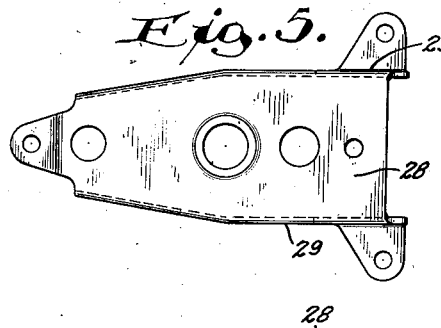
Fig. 5 is a top view showing the shape of the supporting bracket.
Figure 7:
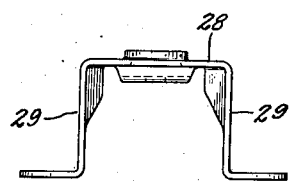
Fig. 7 is a view taken from the right-hand end of the supporting bracket and further illustrating the shape thereof, the several views of the supporting bracket being deemed desirable to permit accurate identification thereof in Figs. 1, 2, and 4.
Figure 6:
Fig. 6 is a side elevation further illustrating the shape of the supporting bracket.
Figure 8:
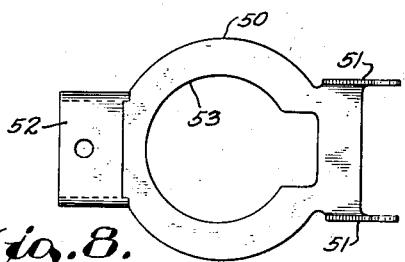
Fig. 8 is a top view showing the loading element or lever for compensating for increase in float buoyancy upon use of fuels of higher specific gravity than that for which the float is designed.
Figure 10:
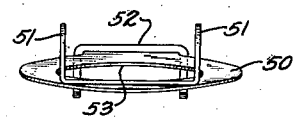
Fig. 10 is a view taken from the right-hand end of the loading element or lever to permit accurate identification thereof in Figs. 1, 2, and 4.
Figure 9:
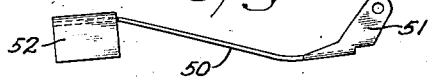
Fig. 9 is a side view to show the shape of the loading element or lever.
Figure 4:
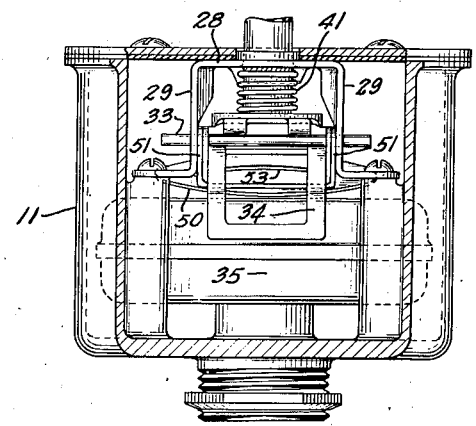
Fig. 4 is a vertical, sectional view taken on the plane of line 4—4 of Fig. 2 and looking at the sectioned end of the entire structure from the right for the purpose of further illustrating the arrangement and relation of the various parts of the structure aand particularly the mounting of the means for neutralizing the effect of higher specific gravity fuel on the float.

Referring to the drawing by characters of reference, the reference numeral 11 designates a casing defining a chamber 12 in which liquid fuel is to be controlled to a substantially constant level and which contains the other portions of the device particularly related to the present invention. Liquid fuel flows into the chamber 12 from a reservoir (not shown) by way of a fuel inlet passage 13 provided with a strainer 14. After passing through the strainer 14 the fuel flows into a passage 17 threaded at the upper end thereof to receive a valve housing 18 in which is mounted a valve 19 shown as being of the needle type movable axially in the housing to and from a seat for the needle formed therein. Valve 19 controls the flow of fuel into chamber 12 and is biased toward open position by a spring 20 seated at one end on an enlarged portion of the valve housing and seated at the other end against a sleeve 21 secured on the upper or stem portion of the valve. The sleeve 21 is externally threaded to receive a substantially cubical nut 22 frictionally held in any of its adjusted positions by a spring 23 acting between a washer 24 beneath the nut and a flanged cup 25 mounted on the sleeve and also serving as a partial enclosure of the upper end of the spring 20. The nut 22 is held against turning but the stem of the valve 19 is slotted at its upper end and, together with sleeve 21, may be turned to adjust the degree of compression of spring 20 and hence to adjust the tendency of such spring to open the valve 19.

A bracket of generally channel shape, having a top portion 28 and side wall portions 29 depending therefrom, is mounted in casing 11 by screws 30 extending through the top portion of the bracket at one end thereof and through lugs extending laterally from the lower edges of the side wall portions of the bracket at the other end thereof. A pin 33 extends through the side wall portions 29 to form a supporting and pivoting pin for a bell crank lever 34, one arm of which is bifurcated or forked to extend about the nut 22 to hold the nut against turning and with the bifurcated ends bent in arcuate shape to form a rocking bearing on the washer 24. The other arm of the lever 34 is connected with a float 35 shown as being annular or "doughnut" shaped and of sufficient size to extend from substantially beneath the pivot 33 toward and adjacent to the wall of the chamber 12. Rising of the fuel level raises float 35 which, through lever 34 and washer 24, acts on sleeve 21 and valve 19 to close the valve against the pressure of the spring 20, thereby maintaining a substantially constant level of fuel in the chamber 12.

Discharge of fuel from chamber 12 takes place by way of an outlet passage 38 formed in a portion 39 of the casing extending upwardly into the chamber and provided with a seat at the upper end thereof to receive a valve 40 which controls flow of fuel through the passage. The valve 40 is constructed as shown in Patent 2,183,815, issued to Roy W. Johnson on December 19, 1939, and is biased toward closing position by a spring 41. The outlet valve of the present application, however, differs from the structure shown in the above identified patent in the construction of the cam collar 42 which is herein shown as having an active camming under surface formed by a split annulus 43 of resilient material secured at one end to the collar 42 and free at the other end thereof except for restraint by a set screw 44 by which the shape of the cam surface may be adjusted as desired thereby adjusting the rate of opening of the valve 40. The cam abutment and its adjusting means are as shown in the above identified patent and have been omitted in the drawings of the present application for the sake of clearer illustration of structure not heretofore disclosed.

The float 35 is made of a material not affected in any way by the fuels to be used and is preferably metallic. The dimensions of the float are accordingly fixed at the time of manufacture and are determined by the fuel for which the burner is best fitted and which is preferably one of the low specific gravity hydrocarbons, such as gasoline. The dimensions of the float are calculated to secure a predetermined position of the float in the chamber and hence to control the inlet valve 19 to maintain a desired level of the preferred fuel in the chamber. When a substitute fuel must be used, the available substitutes are usually of high specific gravity, such as fuel oil, and the float 35 then rises to a position at which the inlet valve 19 is closed. However, if means are provided for compensating for the increased buoyancy of the float in heavier fuel, such fuel can be readily substituted for the preferred lighter fuel. One form which the compensating means may take is a weight applicable to the side of the float 35 farthest from the pivot pin 33 and such weight may take the form of a lever 50 pivotally mounted on the pin 33 by means of ears 51 extending upwardly at one end thereof. The lever 50 is preferably approximately annular in shape to extend around the outlet valve 40 and its cam adjusting means. The free end of the lever 50 extends over a portion of the float remote from the pivot pin 33 and has mounted thereon a substantially U-shaped pressure pad 52 with an aperture 53 provided through the lever and the pad.

A sleeve is mounted on the supporting bracket 29, 29 and is divided on an oblique plane into a lower portion 54 fixed to the bracket and an upper portion 55 formed with a knurled head 56. A stem 57 is secured in the upper sleeve portion and extends through the entire sleeve into the chamber 12 and through the aperture 53 in the compensating or loading lever and the pressure pad. A head or washer 58 is mounted on the end of the stem 57 below the lever 50 for the purpose of engaging the end of the lever and the pressure pad upon lifting of the stem against the compression of a spring 59 acting between the end of the sleeve portion 54 and a flange or washer 60 fixed on the stem. Such upward movement of the stem is obtained by rotating the sleeve portion 55 until the relatively pointed lower end thereof engages in a notch 61 formed in the relatively pointed upper end of the sleeve portion 54.

In operation, when the normal low specific gravity fuel is used for which the float was designed, the head 56 and stem 57 are lifted and rotated until the point of the sleeve portion 55 engages in the locking notch 61, as shown in Fig. 3. Such lifting of stem 57 and head 58 lifts the compensating pressure pad 52 and lever 50 from the float 35 and rotates the lever 50 upwardly, thus releasing the float to operate with the buoyancy for which it was designed. However, when only fuel of higher specific gravity is available, the head 56 is lifted to release the point of sleeve portion 55 from the locking notch 61 and the spring 59 then rotates such sleeve portion into the position shown in Fig. 2. The stem 57 and the head 58 are then lowered to release the pressure pad 52 and the pad comes into contact with the float 35 and, due to the weight of the pad and the lever 50, exerts a force on the float 35 which reduces the buoyance of the float to a sufficient degree to maintain the level of the higher specific gravity fuel at only a slightly higher point than was the case for the lower specific gravity fuel for which the float was designed.

It will be understood that the degree of compensation required from the float loading device is calculated for the heaviest fuel likely to be encountered. Any fuels may be used in the range of specific gravities from the lighter fuel, for which the float was designed, to heavier fuels, for which excess buoyancy must be compensated, that is the float must be loaded.

In a device of the character to which the present invention relates, it is desired to maintain a predetermined hydrostatic head on the fuel thereby obtaining a constant pressure and a desired flow in the fuel supplied to a burner. When lower specific gravity fuel is used, the lower viscosity of the fuel produces a sufficient flow at a lower hydrostatic head, and the float is therefore designed for such fuel and allowed to operate at its calculated normal buoyancy. With a higher specific gravity fuel, which is likewise higher in viscosity, the hydrostatic head must be increased to maintain a flow of the quantity of fuel necessary to the proper operation of the burner. The designed buoyancy of the float must therefore be decreased to permit the heavier fuel level to rise above the level determined for light fuel. The present invention accordingly provides a chamber through which the flow of fuel is controlled by an inlet valve biased into open position and moved toward closing position by a float designed to maintain a predetermined level of lower specific gravity fuel and in which means are provided for compensating for the increased buoyancy of the float in fuel of higher specific gravity, thereby permitting use of the device to secure a constant pressure in fuels of different specific gravity supplied to the same burner.

Although but one embodiment of the present invention has been illustrated and described, it will be apparent to those skilled in the art that various changes and modifications may be made therein without departing from the spirit of the invention or the scope of the appended claims.

I claim:

1. In a constant liquid flow control device, a casing defining a chamber having inlet and outlet passages, a valve controlling the flow of liquid through the inlet passage into the chamber, a float designed for a given buoyancy in a liquid of low specific gravity and connected with said valve to actuate the same upon rise in level of liquid in the chamber, a lever pivotally mounted in the chamber and arranged normally to rest at one end thereof on said float, lever raising means, means mounting said lever raising means in operative relation to said lever to raise said lever out of engagement with said float, and means engageable with a part of said lever raising means as said latter means reaches a predetermined position to releasably lock the lever raising means in position to retain said lever out of engagement with said float to retain the predetermined buoyancy thereof upon flow through the chamber of liquid of the given specific gravity.

2. In a constant liquid flow control device, a casing defining a chamber having inlet and outlet passages, a valve controlling the flow of liquid through the inlet passage into the chamber, a float designed for a given buoyancy in a liquid of low specific gravity and connected with said valve to actuate the same upon rise in level of liquid in the chamber, a lever pivotally mounted in the chamber and arranged to rest at one end thereof on said float at a point remote from the pivotal mounting of the lever, and means for lifting said lever away from said float and for locking it in such position upon flow through the chamber of liquid of the given specific gravity.

3. In a constant liquid flow control device, a casing defining a chamber having inlet and outlet passages, a valve controlling the flow of liquid through the inlet passage into the chamber, a float designed for a given buoyancy in a liquid of low specific gravity and connected with said valve to actuate the same upon rise in level of liquid in the chamber, a lever pivotally mounted at one end in the chamber and extending over said float, a pressure pad mounted on the free end of said lever to add weight thereto, a stem mounted for axial and rotary movement arranged to be lifted into engagement with and to raise and hold said lever away from said float during flow through the chamber of liquid of the given specific gravity and means for engaging the stem to raise the same when the latter is rotated and to releasably maintain said stem in raised position with the lever out of engagement with the float.

4. In a constant liquid flow control device, a casing defining a chamber having inlet and outlet passages, a valve controlling the flow of liquid through the inlet passage into the chamber, a float designed for a given buoyancy in a liquid of low specific gravity and connected with said valve to actuate the same upon rise in level of liquid in the chamber, a lever pivotally mounted at one end in the chamber and extending over said float, a pressure pad mounted on the free end of said lever to add weight thereto, a stem arranged to be lifted into engagement with and to raise said lever away from said float during flow through the chamber of liquid of the given specific gravity, and means for locking said stem in the lifted position thereof.

5. In a constant liquid flow control device, a casing defining a chamber having inlet and outlet passages, a valve controlling the flow of liquid through the inlet passage into the chamber, a float designed for a given buoyancy in a liquid of low specific gravity and connected with said valve to actuate the same upon rise in level of liquid in the chamber, a lever pivotally mounted at one end in the chamber and extending over said float, a pressure pad mounted on the free end of said lever to add weight thereto, a stem arranged to be lifted into engagement with and to raise said lever away from said float during flow through the chamber of liquid of the given specific gravity, a spring mounted on said stem and compressed upon lifting thereof, and means for holding said stem against accidental displacement thereof from the lifted position.

LOURDES V. McCARTY.

REFERENCES CITED

The following references are of record in the file of this patent:

UNITED STATES PATENTS

| Number | Name | Date |
| --- | --- | --- |
| 54,682 | Cameron | May 15, 1866 |
| 304,278 | Ostrander | Aug. 26, 1884 |
| 592,198 | Farmer | Oct. 19, 1897 |
| 602,548 | Williams | Apr. 19, 1898 |
| 1,204,156 | Hubbell | Nov. 7, 1916 |
| 1,459,486 | Whitney | June 19, 1923 |
| 2,201,974 | Anderson | May 28, 1940 |